United States Patent [19]

Knudson et al.

[11] Patent Number: 4,879,083

[45] Date of Patent: Nov. 7, 1989

[54] CHEMICALLY TREATED WOOD PARTICLE BOARD

[75] Inventors: Robert M. Knudson; Marek J. Gnatowski, both of Coquitlam, Canada

[73] Assignee: MacMillan Bloedel Limited, Canada

[21] Appl. No.: 207,955

[22] Filed: Jun. 17, 1988

[51] Int. Cl.⁴ ............................................. B29C 43/02
[52] U.S. Cl. ..................... 264/122; 106/18.3; 252/602; 252/604; 252/607; 264/109; 524/405
[58] Field of Search ................ 264/109, 122; 524/404, 524/405; 252/602, 604, 607; 106/18.3, 18.13

[56] References Cited

U.S. PATENT DOCUMENTS

| 3,718,615 | 2/1973 | Woods et al. | 524/405 |
| 3,816,307 | 6/1974 | Woods | 524/405 |
| 4,076,871 | 2/1978 | Short et al. | 252/607 |
| 4,104,374 | 8/1978 | Reuther et al. | 264/109 |
| 4,145,242 | 3/1978 | Chow | 156/316 |
| 4,228,202 | 10/1980 | Tjannberg | 264/109 |
| 4,241,113 | 12/1980 | Lund | 428/326 |
| 4,438,028 | 3/1984 | Schmittmann et al. | 106/18.13 |
| 4,457,978 | 7/1984 | Wawzonek | 264/109 |
| 4,643,868 | 2/1987 | Knudson et al. | 264/109 |

FOREIGN PATENT DOCUMENTS 62857 5/1981 Japan ............................. 106/18.13

OTHER PUBLICATIONS

Evaluation of the Preservative Effects on Mechanical Properties and Biodurability of Aspen Waferboard, Schmidt, et al., Oct. 1982.

Primary Examiner—Jan H. Silbaugh
Assistant Examiner—Mary Lynn Fertig

[57] ABSTRACT

A method of making a borate treated wood particle board by applying an adhesive resin and a particulate borate treating agent (anhydrous borax or zinc borate) in a dry form to the wood particles to produce treated wood particles (wafers). The treated wood particles are formed into a mat and consolidated under heat and pressure to distribute the resin in the wood before the viscosity of the resin is effected by contact with a sufficient amount of borate to significantly impair penetration of the resin into the wood.

8 Claims, No Drawings

CHEMICALLY TREATED WOOD PARTICLE BOARD

FIELD OF THE INVENTION

The present invention relates to a borate treated consolidated wood particle board. More particularly, the present invention relates to a borate treated wood wafer board and method of producing the same wherein the borate is added as in anhydrous borax or zinc borate in particulate form.

BACKGROUND OF THE INVENTION

Many attempts have been made to pre-treat wood particles such wood wafers of the like for use in the manufacture of a consolidated treated wood product such as particle or wafer board.

For example, it is known to treat wood wafers with ACA or CCA (ammoniacal copper arsenic or chromated copper arsenic). The ACA has been found to be more effective, particularly when added with the wax than CCA. See "Evaluation of the Preservative Effects on Mechanical Properties and Biodurability of Aspen Wafer Board", a paper presented at Pensicola, Fla. on Oct. 5–7, 1982, by E. L. Smithe, H. J. Hall and R. O. Gertjejansen.

U.S. Pat. No. 4,241,113 issued Dec. 23, 1980—Lund also described treated wood wafer for making board where the wood wafers are treated with a preservative compatible with any suitable adhesive such as phenol formaldehyde or the like and states that the binder, wax and other additives may be added separately or in any sequence or in combined form.

It is also known to utilize a boron compound such as borax or boric acid as taught for example in U.S. Pat. No. 4,145,242 issued Mar. 20, 1978 to Chow wherein the boron compound is applied to the wood to preserve the glue bondability of the wood during drying and storage. It was found that the bond could be improved provided the amount of borax on the surface is within a very specific range, however, additions of borax outside the range were detrimental to glueability.

In a recent patent to Knudson and Ehrenfeller, U.S. Pat. No. 4,643,868 issued Feb. 17, 1987, a system is described for applying chemicals to wood particles by first treating the wood particles such as wafers with a wax and then an ammoniacal copper arsenic solution (ACA) and then with adhesive. The concept described is elimination of the necessity for drying prior to consolidation under heat and pressure.

It is also known to use borax as a treating chemical for preserving wood against fungus decay. Products, for example, marketed under the trademark Timbor by U.S. borax (disodium Octiborate Tetrahydrate) rely on diffusion in order to permeate or distribute the borax through the wood. This requires a relatively dilute solution, in other words, a significant amount of moisture be present to attain the required degree of distribution. It is apparent that if this technique is used with wood particles that are subsequently pressed under elevated temperature and pressure conditions, the high moisture content will result in blistering and other defects in the finished product. Furthermore, the borax in solution will contact the resin and result in changing of the resin characteristics and inhibiting of penetration of the resin into the wood.

BRIEF DESCRIPTION OF THE PRESENT INVENTION

It is an object of the present invention to provide a system of treating wood particles such as wood wafers for making consolidated board incorporating borates in sufficient quantities to modify the properties of the wood product to resist degradation by organisms and without significantly interfering with the adhesive bonding of said wood particles.

Broadly, the present invention relates to a method of making a borate treated consolidated wood product from wood particles comprising applying a phenol formaldehyde resin and particulate boron compounds of low solubility rate namely in the form of anhydrous borax or zinc borate having a particle size of less than 30 mesh to said wood particles to provide treated wood particles, laying the said treating wood particles into a mat and consolidating the mat under heat and pressure to form a consolidated wood product.

DESCRIPTION OF THE PREFERRED EMBODIMENTS

The concept of the present invention relates to applying boron compounds particularly borates in the form of anhydrous borax or zinc borate (which have low solubility rates compared with borax compounds normally used as additives to the wood products) to wood particles (wafers) also treated with phenol formaldehyde resin (the resin conventionally used in forming wood particle board such as wafer board) and consolidating the treated particles under heat and pressure in the normal manner.

It has been found that phenol formaldehyde, when contacted with borates tends to increase in viscosity and thereby impair its ability to penetrate the wood and produce a good bond. It is believed that by selecting borates in a form that is less soluble the number of ions that contact the adhesive is significantly reduced, whereby the resin is not changed significantly and remains in a form that can penetrate the wood so that the bond strength of the resulting consolidated board is not significantly impaired.

It is believed that the interference with the bond caused by the addition of borates (i.e. borax) to the wood particles prior to formation of a consolidated board occurs because, during the pressing operation, steam is generated and condensed on the surface of the wood particles. This condensing steam dissolves the borax and facilitates reaction with the adhesive thereby impairing the bonding efficiency of the adhesive and limiting significantly the quantity of borates that may be incorporated in the wood particles if adequate bond is to be maintained. The form of borates normally used as a preservative is for example Timbor (a trademark of U.S. Borax) which chemically is disodium Octaborate Tetrahydrate.

In experimental results, applicant has found that borates, which are relatively water soluble and which are known to impair bonding when added in the significant quantities that are required to provide preservative protection, can be incorporated in the required amounts for preservative protection purposes provided the interaction of the borates with the adhesive resin is inhibited until the resin has penetrated the wood. It has been found that if a low solubility rate borate such as zinc borate or anhydrous borax is used, the amount of borax dissolved by the steam front as it moves through the board during the consolidation, is such that the resin viscosity is not impaired sufficiently to affect the bond.

The preferred system of the present invention is to use a solid material such as anhydrous borax or zinc borate, both of which are significantly lower solubility rate in water than borax or hydrated borax, as the preservative. The anhydrous borax or zinc borate must have a small particle size so that it may be uniformly distributed over the surface of the wafers.

It will be apparent that the smaller the particle size, the more surface area there is available and thus the more tendency for the material to dissolve and interfere with the viscosity and thus impair the bond formed by the phenol formaldehyde adhesive.

It is important that the particle size of the borax be relatively small if uniform distribution of the borax throughout the wafers is to be obtained as is essential to obtain the required protection in the resultant product. Applicant has found that adequate results can be obtained with particle sizes as large as those passing through a 30 mesh screen however, it is preferred to use smaller particles in the range of those passing through about a 50 mesh or even more preferably a 60 mesh screen.

Generally the least expensive additive that will produce the required result will be used thus the preferred additive is anhydrous borax which can be incorporated in the consolidated product using the process of the present invention in quantities sufficient to protect the product and without significantly impairing the internal bond of the resulting consolidated product.

In order to test present invention in the laboratory, a plurality of panels were made in a conventional manner by adding the treating agent in particulate form (less than 60 mesh) to the wafers and comparing the consolidated panels with a control made in the same way but without the preservative treatment. Results obtained are summarized in Table 1.

It will be apparent that the use of anhydrous borax or zinc borate with resin compared with the control gave no significant different in strengths as indicated by test #1 and #2 in Table 1.

When the anhydrous borax or zinc borate was mixed with dispersing agent, namely Claytone, the product was not satisfactory in that its internal bond was reduced significantly to the extent that the product would not be acceptable.

In test #3 and #4 Timbor TM, a disodium octaborate tetrahydrate, was used as an additive. The strength of the resultant board was reduced to an unacceptable level it is believed due to the solubility of the Timbor and its effect on the adhesive.

Based on the laboratory results mill trials were conducted to test the effectiveness of the anhydrous borax. In these trials about 0.25% of anhydrous borax was applied to the face and core wafers for the consolidated product. Face wafers were treated with about 2.4% bakelite TRB 9235 phenol formaldehyde resin while the core wafers were treated with about 2.4% Borden W3154K phenol formaldehyde resin. All the wafers were treated with 1.5% slack wax. The Borden resin which is a faster curing resin than the Bakelite resin was used in the core since the core is not heated as fast as the faces. This variation in curing rates between face and core resins is conventional. All the above percentages are based on dry weight of the wood wafers.

All manufacturing operations were normal except for the anhydrous borax addition. The panels formed were 7/16 of an inch thick and were pressed for the time of 3.25 minutes to consolidate the mat into a panel.

The internal bonds of the panels made from wafers treated with anhydrous borax were significantly higher in all cases than were the internal bonds of the untreated control panels. The panels formed from anhydrous borax treated wafers had internal bonds that averaged about 50 psi whereas the untreated (control) panels averaged about 45 psi. Furthermore the American Plywood Association D4 aging tests the retention in percent for the panel incorporating anhydrous borax treated wafers was about 78% versus only 69% for the control panel.

Surprisingly in the actual mill trial the addition of anhydrous borax improved the internal bond of the board.

It is generally accepted that about 0.2% borax in the wood provides adequate protection from deterioration by most wood destroying organisms. Borates in the amount of at least 0.2% based on the weight of the wafers and preferably at least 0.25% will be applied to the wafers. Additons of borax above about 1% add little, if anything, to the protective properties of the invention and thus would not likely be used. Also as the amount of borax added is increased its availability to impair bonding is increased and thus it is preferred to add no more than that required for protection.

It will be apparent that the anhydrous borax did not dissolve sufficiently to impair the adhesive yet it apparently had some affect on the bonding. Presumably the number of ions available to the resin when the resin was curing was only sufficient to improve the bond as taught by U.S. Pat. No. 4,145,242 to Chow yet the borate is present in the finished panel in an amount sufficient to impair degradation by micro organisms.

The addition of the anhydrous borax to the wafers did not require significant change of any of the other parameters of the process as exemplified by the mill trial wherein the operations were the same for the control as for the trial wherein the borax in anhydrous form was applied to the wafers before consolidation.

Having described the invention modifications will be evident to those skilled in the art without department from the spirit of the invention as defined in the appended claims.

TABLE 1

| | | | Internal Bond, | A.P.A. D4 Test % Bending Strength | Internal Bond Results (vs Control) | | A.P.A. D4 Aging Test Bending Strength Retention | |
|---|---|---|---|---|---|---|---|---|
| Test No. | Panel Types Compared | | psi | Retention | t-value | Significance | t-value | Significance |
| | Control | mean | 58.8 | 56.6 | | | | |
| | | st dev | 4.1 | 18.4 | | | | |
| | | n* | 120 | | | | | |
| 1 | 0.75% Anhydrous Borax mixed with resin | mean | 56.3 | 63.9 | 1.02 | NS | 0.87 | NS |
| | | st dev | 6.1 | 18.4 | | | | |
| | | n | 80 | | | | | |
| 2 | 0.75% Zinc Borate | mean | 60.8 | 53.0 | 0.58 | NS | 0.63 | NS |

TABLE 1-continued
COMPARING UNTREATED AND BORAX-TREATED MATERIAL

| Test No. | Panel Types Compared | | Internal Bond, psi | A.P.A. D4 Test % Bending Strength Retention | Internal Bond Results (vs Control) | | A.P.A. D4 Aging Test Bending Strength Retention | |
|---|---|---|---|---|---|---|---|---|
| | | | | | t-value | Significance | t-value | Significance |
| | mixed with resin | st dev | 9.0 | 6.1 | | | | |
| | | n | 80 | | | | | |
| 3 | 0.75% Timbor ™ mixed with resin | mean | 50.2 | 33.8 | 4.39 | *** | 3.50 | *** |
| | | st dev | 3.1 | 7.5 | | | | |
| | | n | 40 | | | | | |
| 4 | 0.75% Timbor ™ +0.45% Sodium Metasilicate mixed with resin | mean | 34.6 | 43.9 | 16.83 | *** | 1.23 | NS |
| | | st dev | 1.1 | 12.6 | | | | |
| | | n | 20 | | | | | |

Timbor - a trademark of U.S. Borax for disodium octaborate tetrahydrate
n* = number of panels tested for each panel type. Ten internal bond samples, four unaged D4 samples and four aged D4 samples tested from each panel.
***indicates 99% confidence that difference between means is statistically significant

We claim:

1. A method of making a chemically treated, consolidated wood product from wood particles comprising applying a phenol formaldehyde resin and at least one particulate boron compound selected from the group consisting of anhydrous borax and zinc borate having a particle size of less than 30 mesh to substantially uniformly distribute particles of said particulate boron compound on the surface of the wood particles and produce treated wood particles, laying said treated wood particles into a mat, consolidating said mat under heat and pressure to consolidate said treated wood particles into said consolidated wood product having an internal bond equivalent to the internal bond of a similar consolidated wood product not containing said boron compound.

2. A method as defined in claim 1 wherein said boron compound is applied in the amount of at least 0.2% based on the dry weight of the wood particles.

3. A method as defined in claim 2 wherein said wood particles are wood wafers.

4. A method as defined in claim 3 wherein said boron compound has a particle size of at least 50 mesh.

5. A method as defined in claim 4 wherein said boron compound is added in an amount of between 0.25 and 1% based on dry weight of the wafers.

6. A method as defined in claim 2 wherein said boron compound has a particle size of at least 50 mesh.

7. A method as defined in claim 2 wherein said boron compound is added in an amount of between 0.20 and 1% based on dry weight of the wood particles.

8. A method as defined in claim 6 wherein said boron compound is added in an amount of between 0.20 and 1% based on dry weight of the wood particles.

* * * * *